United States Patent Office 3,325,900
Patented June 20, 1967

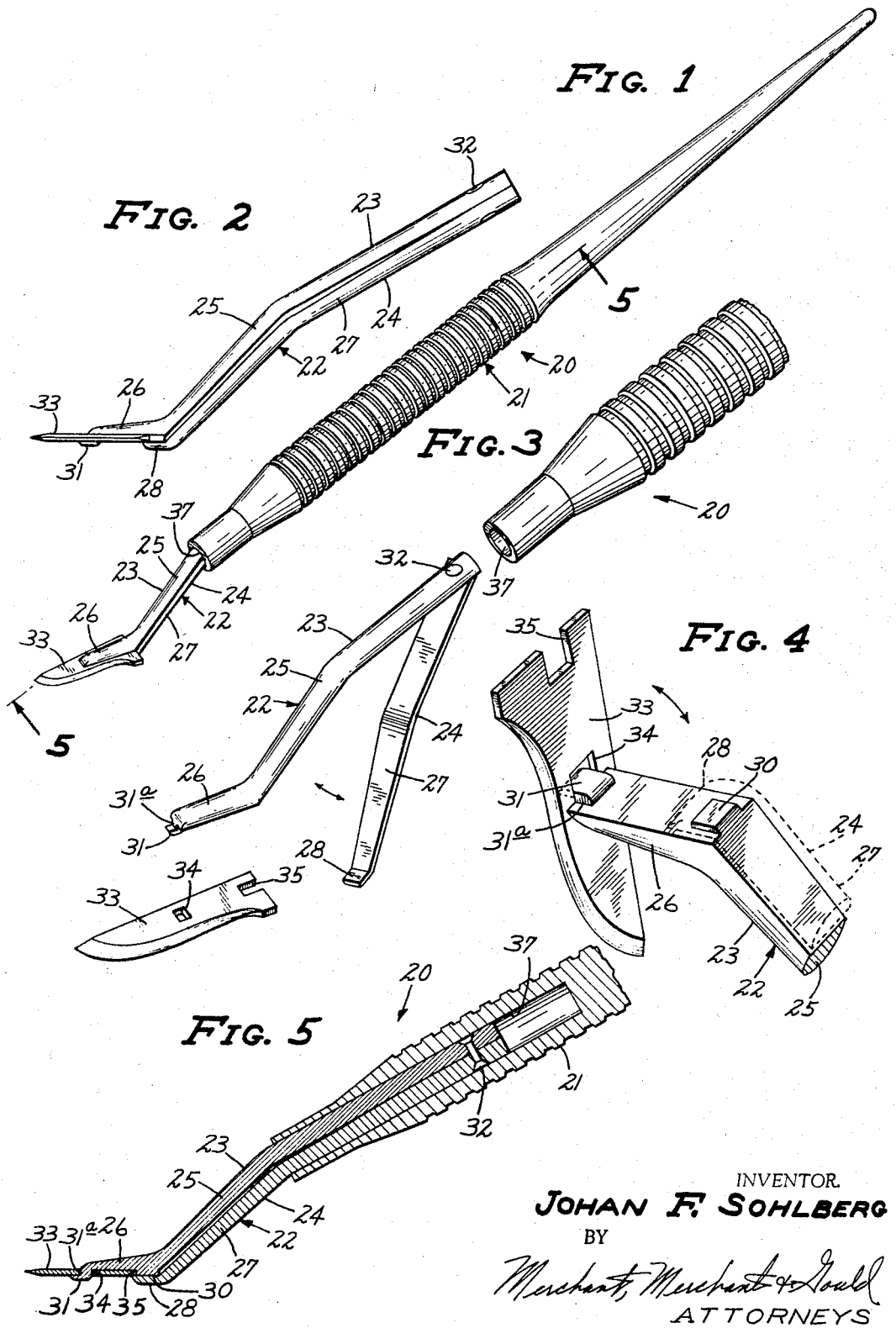

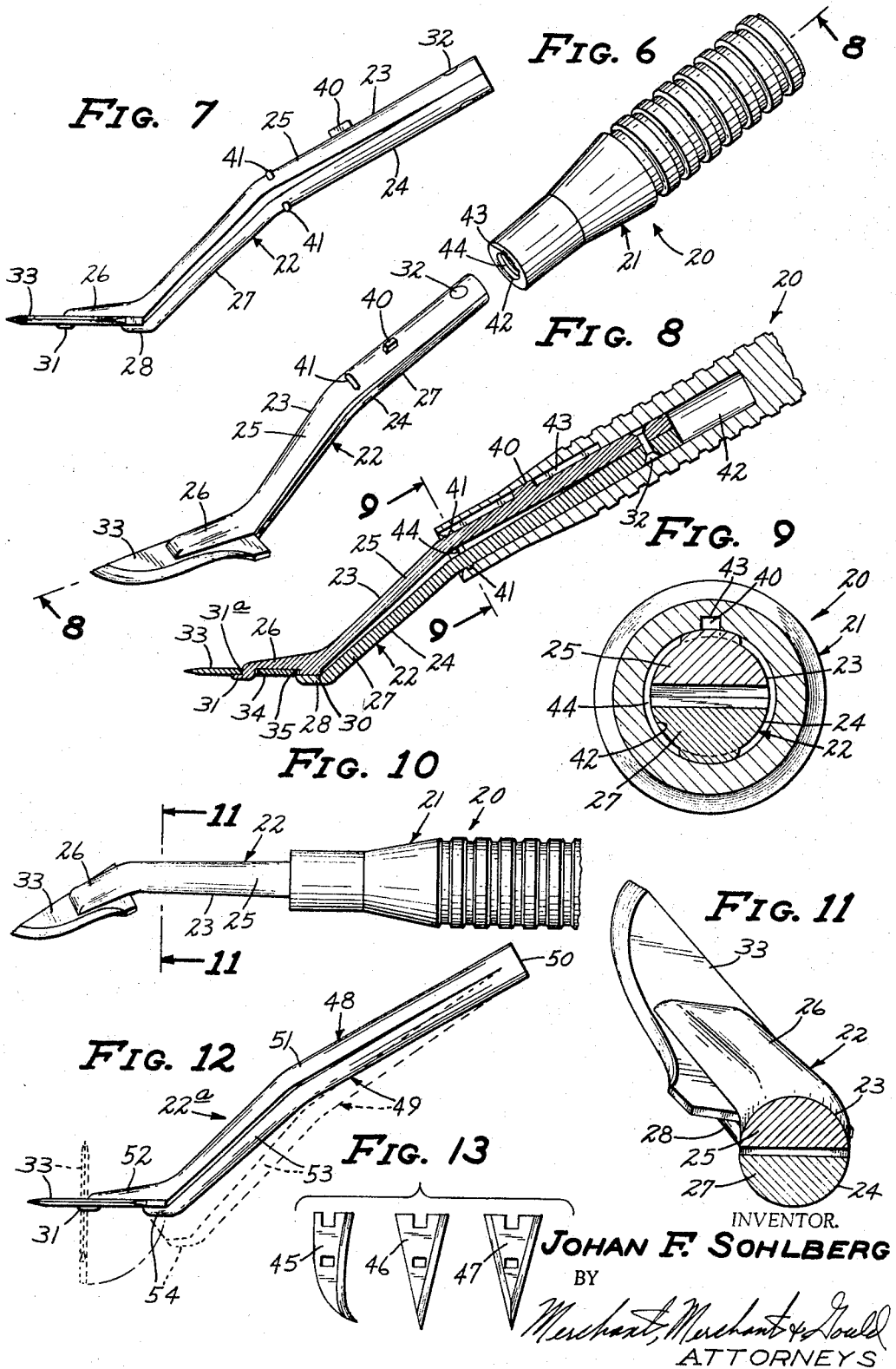

3,325,900
SURGICAL BLADE HOLDER FOR DENTISTRY
Johan F. Sohlberg, 2433 Girard Ave. S.,
Minneapolis, Minn. 55405
Filed Apr. 30, 1964, Ser. No. 363,780
7 Claims. (Cl. 32—46)

This invention pertains to improvements in surgical instruments and more particularly to improvements in dental knives for use in periodontal surgery.

A great many different types of dental knives are available on the commercial market at the present time, and although these knives perform satisfactorily, they have a serious disadvantage in that they are constructed in a unitary one-piece construction and hence the blade portion of the knife is not replaceable. While there are procedures for resharpening these knives, these procedures are rather difficult to perform properly and are time consuming. Furthermore, a resharpened knife seldom if ever, performs as well as a new knife.

While surgical knives, or scalpels, having replaceable blades are well known in other areas of the medical profession, these types of instruments are not available to the periodontal surgeon. One reason for this is because of the great variety of dental knives required, both from the variety of sizes and shapes of knife blades required, and from the need for a large variety of angular relationships between the knife blade and handle. Furthermore, to be of any practical value, a dental knife having a replaceable blade portion would have to have a minimum number of moving parts; would have to allow fast, easy blade changing or substitution; and would have to hold the blade completely motionless. In addition, means would be required by which the angular relationship between the blade portion and the handle of the surgical knife could be varied.

The surgical knife of the present invention meets all of the above requirements. Roughly, the dental knife of the present invention comprises a blade holder including a first and a second member each having a shank portion and a blade support portion, each blade support portion being integrally connected to one end of the respective shank portions. The other ends of the shank portions are connected together so that the second member of the blade holder is movable to a closed position wherein the blade support portion of the second member engages the blade support portion of the first member. The removable blade of the dental knife is supported between the blade support portions of the first and second members of the blade holder. The blade holder fits into a longitudinal bore in one end of a handle portion in such a manner that the handle portion firmly holds the blade holder so as to prevent rotation of the blade holder with respect to the handle, and further holds the first and second members of the blade holder in a closed position. The blade holder is adapted to firmly hold a variety of differently shaped surgical blades. Furthermore, the blade holder is designed so that the blade support portions are angularly disposed with respect to the shank portions. A variety of blade holders can be provided so as to provide a variety of angular relationships between the blade support portions and the shank portions of the blade holder. This allows the surgeon to quickly and easily modify the surgical knife both with respect to the angular relationship of the blade with respect to the handle, and also with respect to the particular configuration of the blade cutting edge.

It is one object of this invention, therefore, to provide a dental surgical knife having a removable blade.

Another object of this invention is to provide a dental surgical knife capable of utilizing a variety of blade shapes.

A further object of this invention is to provide a dental surgical knife having a replaceable blade wherein the blade is quickly and easily replaced and wherein the blade, when mounted in the knife, is substantially immovable.

These and other objects of this invention will become apparent to those skilled in the art upon consideration of the accompanying specification, claims, and drawings.

Referring to the drawings, wherein like characters indicate like parts throughout the several views:

FIG. 1 is a view in perspective;
FIG. 2 is a view in side elevation of the blade and blade holder of FIG. 1;
FIG. 3 is a fragmentary view in exploded perspective of the structure of FIG. 1 on an enlarged scale;
FIG. 4 is a fragmentary view in perspective of the blade and blade holder of FIG. 1 on a greatly enlarged scale;
FIG. 5 is an enlarged view in axial section as seen from the line 5—5 of FIG. 1;
FIG. 6 is a fragmentary view in perspective of a second embodiment of the present invention with the blade holder removed from the handle;
FIG. 7 is a view in side elevation of the blade and blade holder of FIG. 6;
FIG. 8 is a view in axial section as seen from a line 8—8 of FIG. 6 with the blade holder inserted in the handle;
FIG. 9 is an enlarged view in transverse section as seen from a line 9—9 of FIG. 8;
FIG. 10 is a view in plan of a further embodiment of the present invention, portions thereof broken away;
FIG. 11 is a transverse section on an enlarged scale as seen from a line 11—11 of FIG. 10;
FIG. 12 is a view in side elevation of a still further embodiment of the blade holder of the present invention; and
FIG. 13 is a plan view showing various modifications of the blade portion of the present invention.

Referring to the figures, particularly FIGS. 1–5, there is shown a dental surgical knife 20 having a handle portion 21 and a blade holder portion 22. The blade holder comprises first and second members 23 and 24, member 23 having a shank portion 25 and a blade support portion 26, and member 24 having a shank portion 27 and a blade support portion 28. The blade support portions 26 and 28 extend from one end of, and are integral with, their respective shank portions 25 and 27. The blade support portion 26 has a raised heel portion 30 and a tongue member 31 which extends forwardly from the lower front portion of the blade support member 26. The ends of the shank portions 25 and 27, remote from the blade support portions, are pivotally connected by means of a pivot 32.

An elongated detachable blade portion 33 has a generally centered aperture 34 therethrough, aperture 34 being generally centered on the longitudinal axis of the blade. Blade 33 further has a notch 35 at one end thereof.

The detachable blade 33 is mounted in the blade holder 22 by hooking the tongue member 31 through the aperture 34 of blade member 33 and then rotating the blade so that the raised heel member 30 of the blade support portion 26 is received in the notch 35 of the detachable blade. The second member 27 of blade holder 22 is then pivoted to a closed position wherein the blade support portion 28 of member 24 engages the raised heel portion 30 of blade support portion 26. The transverse width of the blade support portion 28 of member 24 is greater than the transverse width of the notch 35 in detachable blade 33, and hence blade 33 is firmly held in position between the blade support members 26 and 28. In addition, the length and width dimensions of the tongue portion 31a of tongue 31 are substantially identical to the length and width dimensions of aperture 34 in blade 33. Also, the width of the raised heel portion 30 of blade support portion 26 is substantially identical to the width dimension of the notch 35 in blade 33. Therefore, the detachable blade 33 is rigidly held between the blade support portions 26 and 28, blade 33 being substantially immovable. When the blade holder 22 is in its closed position, there is a separation between the shank portions 25 and 27 of members 23 and 24, respectively, that provides a spring force between members 23 and 24.

The handle 21 of surgical knife 20 has a longitudinal bore 37 in one end thereof, longitudinal bore 37 being slightly tapered. The diameter of longitudinal bore 37 is slightly less than the diameter of the blade holder 22. The blade holder 22 is inserted in the longitudinal bore 37 of handle 21, and the members 23 and 24 of blade holder 22 are forced together, or compressed, to provide a spring force between the blade holder 22 and the inside surface of the bore 37 of handle 21, thereby providing a very firm fit between the blade holder 22 and the handle 21.

FIGS. 6 through 9 show a second embodiment of the present invention, with like or similar parts of the second embodiment having the same numerical designation as the corresponding part in the first embodiment.

Referring to FIGS. 6–9, the shank portion 25 of blade holder member 23 includes a raised key portion 40. In addition, a raised collar portion 41 extends at least partially around the circumference of the members 23 and 24 of blade holder 22, the plane of collar 41 being substantially transverse to the longitudinal direction of shank portions 25 and 27 of blade holder members 23 and 24.

Handle 21 of surgical knife 20 has a longitudinal bore 42 in one end thereof, bore 42 having a keyway 43 for receiving the key 40 of blade holder 22. Longitudinal bore 42 of handle 21 further has a circumferential groove 44 toward the forward end thereof. The plane of groove 44 is generally transverse to the longitudinal direction of bore 42. When the blade holder 22 is inserted in the longitudinal bore 42, the key 40 rides in keyway 43, thereby preventing rotation of blade holder 22 with respect to handle 21. Furthermore, when blade holder 22 is inserted in the longitudinal bore 42 of handle 21, the collar 41 of holder 22 snaps into the groove 44 on the inner circumference of bore 42 and prevents accidental or unintended removal of blade holder 22 from the handle 21.

As shown in the drawings, the blade support portions 26 and 28 are angularly disposed with respect to the shaft portions 25 and 27 of blade holder 22. While in the first and second embodiments described hereinbefore, the longitudinal axis of the blade holders 26 and 28 are in the same plane, but angularly disposed to, the longitudinal axis of the shaft portions 25 and 27 of blade holder 22, it is to be understood that this angular relationship is not critical and that any desired angular relationship between the blade support portion and the shank portion of the blade holder can be utilized. For example, FIGS. 10 and 11 show an embodiment wherein the longitudinal axes of the blade support portions 26 and 28 are in a plane which is angularly disposed with respect to the plane containing the longitudinal axis of the shank portions 25 and 27. In addition, while in the first and second embodimets, the blade is shown mounted in a generally horizontal plane, it is to be understood that the blade could be mounted in a vertical plane, or in an oblique plane as shown in FIGS. 10 and 11.

Since the blade 33 is detachable from the blade holder 22, a variety of blade shapes, such as the blades 45, 46 and 47 shown in FIG. 13, can be mounted in the blade holder 22.

Another blade holder embodiment 22a is shown in FIG. 12, and comprises a first member 48 and a second member 49 integrally connected at one end 50. Member 48 comprises a shank portion 51 and a blade support portion 52, while member 49 comprises a shank portion 53 and a blade support portion 54. The blade support portion 52 includes a tongue 31 and raised heel portion not shown but substantially identical to that described in the previous discussion of blade holder 22. To mount the detachable blade 33 in the blade holder 22a, the tongue of blade support portion 52 is inserted in the aperture of blade 33 and the members 48 and 49 of holder 22a are separated so that member 49 is in the dotted line position as shown, and the blade 33 is moved so that the notch of blade 33 receives the raised heel portion of the blade support member 52. The member 49 is then moved to its original position wherein the blade support portion 54 of member 49 abuts against the raised heel of the blade support portion 52. The blade holder 22a is then inserted in the handle 21 as hereinbefore described.

It is to be understood that while I have shown specific embodiments of my invention this is for the purpose of illustration only, and that my invention is to be limited solely by the scope of the appended claims.

What I claim is:

1. A surgical tool comprising:
 (a) a blade holder comprising first and second members each having a shank portion and a blade support portion, each blade support portion being integrally connected to one end of the respective shank portion, said first and second members being connected at the other ends of the shank portions thereof, said second members being movable to a closed position wherein the blade support portion of said second member engages the blade support portion of said first member, at least one of said shank portions having a raised key member thereon and having a raised collar portion;
 (b) and a handle having a longitudinal bore in one end thereof for receiving said blade holder, said bore having a key slot therein to receive the key member on the shank of said blade holder to prevent rotation of said blade holder in said handle, said bore further having a generally transverse groove therein to receive the raised collar portion of said blade holder to lock said blade holder in said handle.

2. A surgical tool comprising:
 (a) a blade holder comprising first and second members each having a shank portion and a blade support portion, said blade support portion having an extended end and an end integral with one end of the respective shank portions, the extended end of the blade support portion of said first member having a tongue extending therefrom in general longitudinal alignment with said blade support portion, the integral end of the blade support portion of said first member having a raised heel member, said first and second members being pivotally connected at the other ends of the shank portions thereof, said second member swinging to a closed position wherein the blade support portion of said second member engages the heel member of blade support portion of said first member, the transverse width of the blade support portion of said second member being greater than the transverse width of the raised heel member of the blade support portion of said first member;
 (b) and a handle having a longitudinal bore in one end thereof for receiving said blade holder, said handle firmly holding said first and second members of said blade holder in a closed position, said handle further having means for preventing rotation of said blade holder in said handle.

3. A surgical tool as described in claim 2 wherein the axes of said blade support portions are angularly disposed with respect to the axes of said shank portions.

4. A surgical tool as described in claim 2 wherein the longitudinal axes of the shank portions of said first and second members are in a common plane and wherein the axes of said blade support portions are angularly disposed with respect to said plane.

5. A surgical tool comprising:
(a) an elongated detachable blade having an aperture therethrough, said aperture being generally centered on the longitudinal axis of said blade, said blade further having a longitudinal notch at one end thereof;
(b) a blade holder comprising first and second members each having a shank portion and a blade support portion, said blade support portion having an extended end and an end integral with one end of the respective shank portions, the extended end of the blade support portion of said first member having a tongue extending therefrom in general longitudinal alignment with said blade support portion, the integral end of the blade support portion of said first member having a raised heel member, said tongue member being hooked through the aperture in said detachable blade and said heel member being receivable in the notch of said detachable blade, said first and second members being pivotally connected at the other ends of the shank portions thereof, said second member swinging to a closed position wherein the blade support portion of said second member engages the heel member of the blade support portion of said first member, the transverse width of the blade support portion of said second member being greater than the transverse width of the notch of said blade;
(c) and a handle having a longitudinal bore in one end thereof for receiving said blade holder, said handle firmly holding said first and second members of said blade holder in a closed position, said handle further having means for preventing rotation of said blade holder in said handle.

6. A surgical tool as described in claim 5 wherein the axes of said blade support portions are angularly disposed with respect to the axes of said shank portions.

7. A surgical tool as described in claim 5 wherein the longitudinal axes of the shank portions of said first and second members are in a common plane and wherein the axes of said blade support portions are angularly disposed with respect to said plane.

References Cited
UNITED STATES PATENTS

| | | | |
|---|---|---|---|
| 115,070 | 5/1871 | Laurence | 32—46 X |
| 342,697 | 5/1886 | Johnson. | |
| 1,008,648 | 11/1911 | Kiefer | 30—85 X |
| 1,492,629 | 5/1924 | Dickey | 30—331 |
| 1,498,890 | 6/1924 | Steedman | 30—85 |
| 1,769,403 | 7/1930 | Van Dusen | 30—339 X |

RICHARD A. GAUDET, *Primary Examiner.*

J. W. HINEY, *Assistant Examiner.*